July 19, 1960  R. L. HENRY ET AL  2,945,988
MACHINE SUPPORT DEVICE
Filed March 31, 1958

INVENTORS
ROBERT L. HENRY
JOSEPH L. BAKER
BY
HIS ATTORNEYS

United States Patent Office 2,945,988
Patented July 19, 1960

2,945,988

MACHINE SUPPORT DEVICE

Robert L. Henry, Columbus, and Joseph L. Baker, Ironton, Ohio, assignors to Henrite Products Corporation, a corporation of Ohio Filed Mar. 31, 1958, Ser. No. 725,182

2 Claims. (Cl. 317—2)

This invention relates to a machine support device. The invention relates more particularly to a machine support device which electrically grounds the machine. The invention relates still more particularly to a mounting device adapted for use with an electric machine which has a rotatable element. The invention relates still more particularly to a mounting device for rotatable electric machines of small physical sizes. However, the invention is not so limited.

It is usually necessary or required that the frame structure of electric machines be connected electrically to a ground. However, numerous problems have been involved in the grounding of the frame structure of a small motor or generator. This is due to the fact that it is customary to resiliently support the bearing housings of a small motor or generator. The resilient means for supporting the motor or generator upon the mounting structure is usually rubber or the like which is an electrical insulator.

Numerous methods have been attempted for providing connection means between the frame or bearing housing of the motor to the mounting structure thereof so that the potential of the frame is the same as that of the mounting structure even though the machine is resiliently supported by insulator material. Jumper connectors of various types have been used. However, in the past it has been found that no jumper means has been completely satisfactory.

It is necessary that the jumper or grounding means be such that the machine may be easily and readily mounted without interference by the jumper. Furthermore, such a jumper means must be one which will withstand vibrational forces. Also, it is desirable that a jumper means be one which may be applied after vulcanization of the resilient material. Furthermore, it is desirable that such jumper or connector be readily visible when the machine is completely mounted so that the fact may easily visibly be determined that the frame is electrically connected to the mounting structure or base.

An object of this invention is to provide a machine support device which includes resilient support means and also includes readily visible means which firmly electrically connects the frame structure of a machine to the mounting structure thereof.

Another object of the invention is to provide a machine support device including ground connector means which does not interfere with or add to the work of mounting an electrical machine.

Another object of this invention is to provide such a machine support device in which the electrical linking means is capable of withstanding vibrational forces.

Another object of this invention is to provide such a machine support device in which the electrical linking means can be attached to the assembly after the resilient member is vulcanized. Thus, an objectionable procedure of vulcanizing the resilient member with the linking means therein is eliminated.

Another object of this invention is to provide such a support device in which the electrical linking means thereof does not transmit vibrational forces from the frame structure to the mounting structure.

Another object of this invention is to provide a grounding link or jumper which may be easily, readily, and firmly attached to other elements of a machine support device.

Other objects and advantages reside in the construction of parts, the combination thereof, the method of manufacture, and the mode of operation, as will become more apparent from the following description.

In the drawing, Figure 1 is a perspective view showing a machine support device of this invention.

Figure 3 also shows the attachment of the connector link of this invention to the mounting rings thereof.

Figure 1:
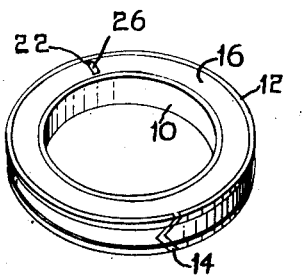

Referring to the drawing in detail, a machine support device of this invention comprises an inner ring 10 which is adapted to snugly encompass a bearing housing of an electrical machine. An outer ring 12 is concentric with the inner ring 10 and is spaced therefrom.

Figure 2:
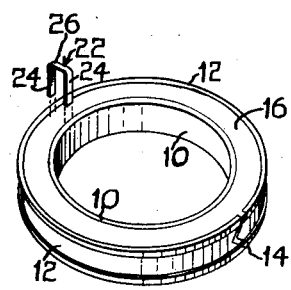
Figure 2 is a perspective view, showing the first step in the attachment of a connector link of this invention to mounting rings thereof.
Figure 3:
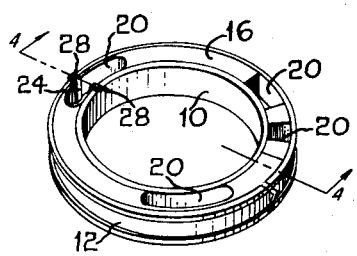
Figure 3 is a perspective view showing the opposite side of the machine support device from the side thereof shown in Figures 1 and 2.

The outer ring 12 is adapted to directly engage a mounting structure or base member for support of the electrical machine. The outer ring 12 may be provided with an opening or gap 14 therein, as shown in Figures 1, 2, and 3. The rings 10 and 12 are of electrical conductor material.

Separating the rings 10 and 12 one from the other is an annular body of elastic electrical insulator material 16 which is preferably rubber or the like. The annular body 16 is provided with a plurality of recesses 20 therein.

A U-shaped conductor link or jumper 22 is provided with a pair of legs 24 joined by a cross member 26. The link 22 is forced through a portion of the body 16, as shown in Figure 2. Preferably the link 22 is forced through a portion of the body 16 which has a recess 20 therein. The link 22, being similar to a staple, can be forced into the body 16 by a stapler machine or the like. Thus, this operation can be carried out after vulcanization of the material of the body 10.

Figure 4:
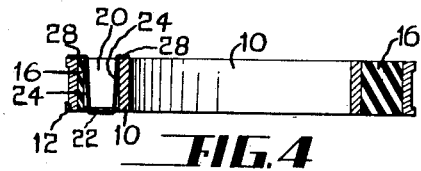
Figure 4 is a sectional view taken substantially on line 4—4 of Figure 3.

The end of each leg 24 of the link 22 is then bent outwardly to form a flange 28, as shown in Figures 3 and 4. The flanges 28 are then attached by welding or the like to the rings 10 and 12 to firmly secure the connector link 22 to the rings 10 and 12. Thus, the connector link 22 is easily and readily firmly electrically connected to the inner ring 10 and to the outer ring 12. Therefore, in the device of this invention the frame structure of an electric machine engaged by the inner ring 10 is directly connected to the outer ring 12 which is in direct engagement with mounting structure for the electric machine. Therefore, the frame structure of the electric machine is grounded when the mounting structure of the electric machine is grounded.

Due to the fact that the conductor link 22 extends through the annular body 16, the cross member 26 thereof is disposed adjacent one edge of the rings 10 and 12 while the flanges 28 of the legs 24 are attached to the opposite edge of the rings 10 and 12. Therefore, at least a portion of the link 22 is clearly visible at either side of the rings 10 and 12 and thus the connector link 22 is readily visible when the machine support device of this invention is connected to an electric machine and the mounting structure thereof.

The connector link 22 firmly electrically attaches the rings 10 and 12 without interference with the resiliency of the elastic body 16.

The connector link 22 is so positioned with respect to the rings 10 and 12 that it does not interfere with the connection of the inner ring 10 to an electrical machine or with the connection of the outer ring 12 to the mounting structure of the machine.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. A support member for a machine having a bearing housing comprising an inner ring engageable with the housing, an annular body of resilient material bonded to the outer surface of the inner ring and concentric therewith, an outer ring concentric with the annular body and with the inner ring and having its inner surface bonded to the annular body, each of the rings having a first edge portion and a second edge portion, a U-shaped conductor member having a pair of leg portions and a cross portion joining the leg portions one to the other, the U-shaped member extending through the annular body at a position intermediate the rings, the cross portion being exterior of the annular body adjacent the first edge portion of the rings, each of said leg portions extending through said resilient material, the end of each leg portion being directly permanently attached one to said inner ring and one to said outer ring at the second edge portions thereof, the U-shaped conductor member thus being visible at each of the edge portions of the rings.

2. A support member according to claim 1, wherein the leg portions are directly permanently attached to the rings by welding.

References Cited in the file of this patent

UNITED STATES PATENTS

| | | |
|---|---|---|
| 2,325,414 | McChesney | July 27, 1943 |
| 2,396,848 | Haushalter | Mar. 19, 1946 |
| 2,583,189 | Shewmon | Jan. 22, 1952 |
| 2,740,073 | Wightman | Mar. 27, 1956 |
| 2,883,132 | Neher | Apr. 21, 1959 |

FOREIGN PATENTS

| | | |
|---|---|---|
| 667,353 | Great Britain | Feb. 27, 1952 |
| 726,363 | Great Britain | Mar. 16, 1955 |